UNITED STATES PATENT OFFICE.

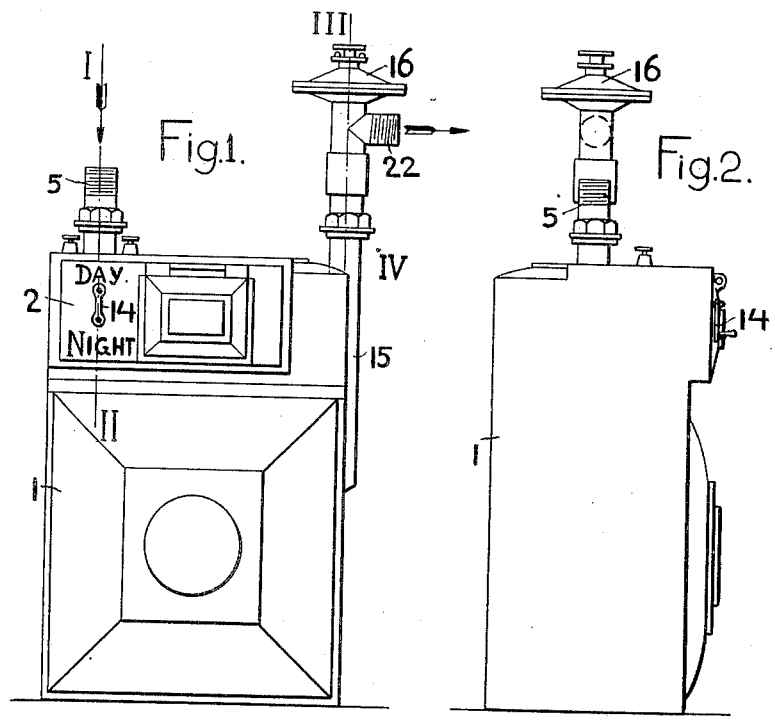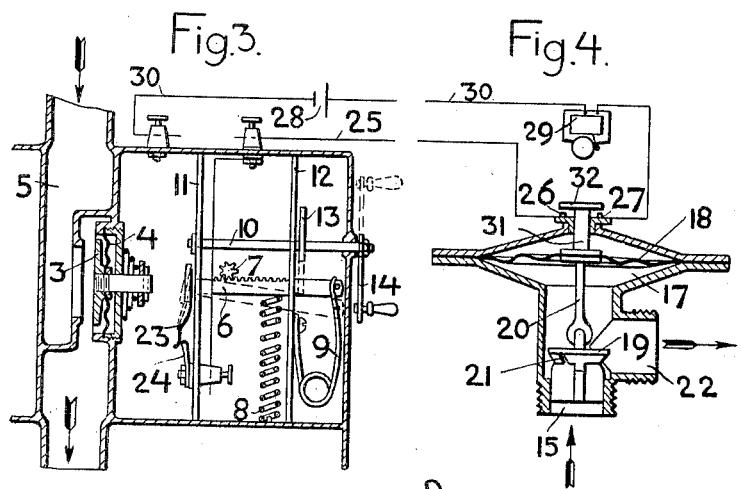

JOHANNES RUTTEN, OF THE HAGUE, NETHERLANDS.

SAFETY DEVICE FOR GAS SYSTEMS.

1,099,619.      Specification of Letters Patent.      Patented June 9, 1914.

Application filed December 29, 1911. Serial No. 668,490.

*To all whom it may concern:*

Be it known that I, JOHANNES RUTTEN, a subject of the Queen of the Netherlands, and residing at No. 1 Trekvlietplein, The Hague, Netherlands, have invented certain new and useful Improvements in Safety Devices for Gas Systems, of which the following is a specification.

This invention relates to a device for automatically cutting off the gas supply from the service piping in such a manner that after a mechanism arranged on the gas meter or other apparatus driven by the gas flowing through the same has been brought into action, only a determined and regulated amount of gas can flow into the house piping while at the same time should the gas consumption become too large a valve is automatically closed and the house gas piping shut off.

The dangers of poisoning and fire are completely removed by this apparatus since the amount of gas which finds its way into the gas pipe after the device has been brought into action, can be made so small that it is not sufficient to effect poisoning but is however sufficient to supply one or two gas burners in a sleeping apartment for a sufficient time.

From the foregoing it is obvious that the device should be brought into action on retiring to bed.

The device consists of a valve inserted in the supply pipe which valve after the device has been brought into action is closed by a rod actuated from the mechanism of the gas meter, when a determined amount of gas has flowed through the meter.

Devices are already known in which the gas meter supplies only a determined quantity of gas, for example, prepayment meters. The regulating mechanism of these prepayment meters can it is true be brought into and out of action, but the arrangement and operation is in many respects different to those of the device according to the present invention.

Should any gas tap remain open after the device is in operation, a small amount only of gas can escape. If the device is again cut out, a large amount of gas would escape through the open tap unless means were provided for preventing this and exerting a control. This control is automatically created by a device inserted in the main pipe.

This device consists of an enlargement of the main pipe in which is arranged a diaphragm with which is connected a valve adapted to shut off the main gas pipe when the said valve is closed, and when open to allow the gas to flow freely into the enlargement and on to the rest of the house pipe system.

Should the pressure in the enlargement or in the house pipe system rise slightly above atmospheric, the diaphragm yields and lifts the valve so that gas can flow through freely. The dimensions of the diaphragm and the actual weight of the valve or the spring pressure tending to keep it closed, are so designed that when all the gas taps are opened, the super-atmospheric pressure is just sufficient to hold the valve open. If however the pressure in the enlargement or in the house piping should fall, the diaphragm automatically produces closing of the valve. The valve however does not close absolutely gas tight, as either it or the valve seating is provided with a narrow groove. If all the taps in the house pipe system are now closed a rise of pressure at once occurs in the enlargement or house piping and the valve opens, the diaphragm yielding to the pressure. If however a gas jet tap were not turned off, or if the house piping is leaky, no excess pressure can take place and the valve remains closed. The danger is thus removed that on again cutting out the device for allowing only a determined amount of gas to enter the house piping, a large amount of gas can escape through a tap which has been left open.

Another advantage of the present device is that should the house piping system become damaged or a flexible tube become torn, or other event occur to allow a large quantity of gas to escape, the super-pressure in the enlargement disappears and the valve inserted in the main pipe automatically closes.

One embodiment of the present invention is illustrated by way of example in the accompanying drawings, in which—

Figure 1 is an elevation of a gas meter provided with the improved device. Fig. 2 an end elevation of the same. Fig. 3 a section through the automatic closing mechanism at the line I—II of Fig. 1. Fig. 4 a section through the control valve at the line III—IV of Fig. 1.

In a gas meter 1 of known construction at the place where the gas enters the meter there is inserted a device 2 as shown in Fig. 3. This device comprises a valve 3 which when in normal position allows gas to flow through freely in the direction of the arrow. When however the valve is pushed to the left, the gas supply is shut off. This valve is connected in known manner with a diaphragm 4 in such a way that the gas cannot escape from the pipe 5 to the space at the right hand side. Opposite the end of the valve 3 away from its seating a rack 6 is slidingly mounted which when the device is in operative position meshes with a spur pinion driven by the clockwork of the gas meter, and is held in mesh by a spiral spring 8. The spur pinion forces the rack over to the left in Fig. 3 till the valve 3 shuts off the gas supply, when no more gas can enter the house piping.

To cut out the device the rack 6 is moved downward sufficiently to bring it out of mesh with the spur pinion 7. A spring 9 then draws back the rack so that it comes into the position shown in dotted lines in Fig. 3 and the valve 3 again opens. To enable this motion of the rack 6 to take place, above the rack there is arranged a spindle journaled in cross bars 11 and 12 in which the rack itself is also slidingly mounted. This spindle carries a disk 13 of round shape, eccentrically mounted which pushes down the rack when a handle 14 is turned. The control device 16 is inserted in the pipe 15 through which the gas from the meter arrives at the house piping. This part of the invention is shown in section in Fig. 4. The pipe 15 is provided with an enlargement 17 in which is fixed a diaphragm 18 which is not tensioned. A valve 19 is loosely suspended from the diaphragm by a link 20 in such manner that when the valve is lowered the inlet of the pipe 15 is closed except for a small leakage. This leakage can be provided for by making a small groove 21 in the valve face or in the seating. The enlargement 17 is in communication through a pipe 22 with the house piping.

The surface of the diaphragm 18 and the weight of the valve along with the link 20, the pin 31 and the plate 32, are so determined that if all gas burners are turned on the superpressure in the enlargement 17 is still sufficient to keep the diaphragm along with the valve 19 in raised position. When the gas consumption however becomes greater than this the pressure in the enlargement falls so that the valve 19 is lowered and the gas supply shut off.

An alarm arrangement can be very simply worked in conjunction with the device. For this purpose the rack or the casing of the gas meter is connected with one pole of an electric cell while the rack makes contact through a tongue 23 when in the position shown in Fig. 3, with a contact 24 in conductive connection through a lead 25 with the terminal binding screw 26 of the control device. A second terminal 27 of the control device is connected through a cell 28 an electric bell 29 and a wire 30, to the casing of the gas meter. To close the circuit through the control device a pin 31 rests loosely on the diaphragm 18 or on the link 20 and thus follows the diaphragm in its up and down movements. In the lowest position of the diaphragm a plate 32 rests on the two contacts 26 and 27.

The operation of the device is the following: Under normal conditions the handle 14 is turned upward to "Day" in the position shown in dotted lines in Fig. 3; the device is then inoperative the pinion 7 not being in mesh with the rack 6. The control device however remains always in action, so that if owing to leakiness of the house piping or any other reason too large an amount of gas should be taken out of the house piping, the valve 19 will shut off the further supply of gas except the inconsiderable quantity which can pass through the intentionally leaky valve. When the handle is turned to "Night" (Figs. 1 and 3) the light in the sleeping apartment can still burn until the valve 3 is closed by the rack 6. The quantity of gas which continues to flow into the house piping when the handle is at "Night" is quite sufficient to keep the light in the sleeping apartment burning long enough, but is not sufficient to poison the air in the room. If the gas jet tap is turned off before the valve 3 has closed, the gas in the main pipe remains under pressure so that the valve 19 remains raised. When the handle 14 is turned down again the rack 6 is moved out of mesh with the pinion 7 and is pulled down by the spring 9. The valve 3 then again opens and the gas flows freely into the house piping. The electric bell cannot sound although the tongue 23 makes contact, because the plate 32 is raised and the circuit not closed. If however a tap has been left on after the valve has been closed by the rack 6, the super-pressure in the enlargement 17 or in the house piping disappears and the valve 19 of the control device closes, whereby the plate 32 brings the contact 26 and 27 into conductive connection. If the handle is now turned to "Day" the spring 9 draws back the rack so that the tongue 23 makes contact and the bell sounds as an indication that a tap has been left on. The valve 3 opens while the valve 19 remains closed since no superpressure can occur in the enlargement 17 or in the house piping owing to the small amount of gas which passes through the leaky valve 19 into the house piping in communication with the atmosphere. When the tap left on is closed a superpressure is formed in the house piping and the valve 19 is lifted whereupon the electric circuit is interrupted and gas flows into the house piping.

Having now described my invention what I claim as new and desire to secure by Letters Patent is:—

1. A safety device for gas supply systems comprising a safety valve inserted in the meter inlet pipe, means actuated from the meter mechanism to close the safety valve after a determined quantity of gas has passed through the meter, means for rendering this closing action operative or inoperative, a control valve in the path of the gas between the safety valve and the house piping, and means whereby the control valve is held open unless the pressure in the house piping falls below a determined minimum.

2. A safety device for gas supply systems comprising a safety valve inserted in the meter inlet pipe, means actuated from the meter mechanism to close the safety valve after a determined quantity of gas has passed through the meter, means for rendering this closing action operative or inoperative, a control valve in the path of the gas between the safety valve and the house piping, means whereby the control valve is held open unless the pressure in the house piping falls below a determined minimum, and means whereby a small amount of gas can leak past the control valve when the latter is closed.

3. A safety device for gas supply systems, comprising a safety valve inserted in the meter inlet pipe, means actuated from the meter mechanism to close the safety valve after a determined quantity of gas has passed through the meter, means for rendering this closing action operative or inoperative, a control valve in the path of the gas between the safety valve and the house piping, means whereby the control valve is held open unless the pressure in the house piping falls below a determined minimum, and an electric alarm circuit which is closed when the safety valve closing mechanism is inoperative and the control valve closed.

4. In a safety device for gas supply systems a safety valve in the meter inlet pipe, a slidable rack capable of gradually pushing the safety valve closed, a spur wheel meshing with the rack and driven from the meter mechanism, a cam disk adapted to move the rack out of mesh with the pinion, a spring to restore the rack to engagement, and a handle for actuating the cam disk.

5. In a safety device for gas supply systems, a control valve in the meter outlet pipe means for allowing a slight leakage past the control valve, and enlargement in the outlet pipe and in communication with the house piping, a slack diaphragm within the enlargement, and a link suspending the control valve from the diaphragm.

6. In a safety device for gas supply systems a safety valve in the meter inlet pipe, a slidable rack capable of gradually pushing the safety valve closed, a spur wheel meshing with the rack and driven from the meter mechanism, a cam disk adapted to move the rack out of mesh with the pinion, a spring to restore the rack to engagement, a handle for actuating the cam disk, a control valve in the meter outlet pipe, means for allowing a slight leakage past the control valve, an enlargement in the outlet pipe and in communication with the house piping, a slack diaphragm within the enlargement and a link suspending the control valve from the diaphragm.

7. In a safety device for gas supply systems, a safety valve in the meter inlet pipe, a slidable rack capable of gradually pushing the safety valve closed, a spur wheel meshing with the rack and driven from the meter mechanism, a cam disk adapted to move the rack out of mesh with the pinion, a spring to restore the rack to engagement, a handle for actuating the cam disk, a control valve in the meter outlet pipe, means for allowing a slight leakage past the control valve, an enlargement in the outlet pipe and in communication with the house piping, a slack diaphragm within the enlargement, a link suspending the control valve from the diaphragm, and an electric alarm circuit made through a pair of contacts on the enlargement and conductively connected when the control valve is closed by a plate attached to the diaphragm, a contact carried by the rack and touching a contact on the meter casing when the rack is in inoperative position, and the meter casing itself.

In testimony whereof I affix my signature in presence of two witnesses.

JOHANNES RUTTEN.

Witnesses:
A. E. JURSIAANN,
A. C. NELSON.

Copies of this patent may be obtained for five cents each, by addressing the "Commissioner of Patents, Washington, D. C."